United States Patent

Wen

[15] 3,646,486

[45] Feb. 29, 1972

[54] GYROMAGNETIC ISOLATOR WHEREIN EVEN MODE COMPONENTS ARE CONVERTED TO ODD MODE COMPONENTS BY BIASED FERRITE

[72] Inventor: Cheng Paul Wen, Trenton, N.J.

[73] Assignee: RCA Corporation

[22] Filed: Oct. 28, 1970

[21] Appl. No.: 84,829

[52] U.S. Cl. ....................333/24.2, 333/21

[51] Int. Cl. ....................H01p 1/32

[58] Field of Search ....................333/21, 24.1, 24.2; 343/772

[56] References Cited

UNITED STATES PATENTS

| | | | |
|---|---|---|---|
| 2,903,656 | 9/1959 | Weisbaum | 333/24.2 |
| 2,943,325 | 6/1960 | Botman | 343/772 X |
| 3,215,955 | 11/1965 | Thomas et al | 333/24.2 X |
| 3,327,251 | 6/1967 | Degan, Jr. | 333/24.2 |

*Primary Examiner*—Herman Karl Saalbach
*Assistant Examiner*—Paul L. Gensler
*Attorney*—Edward J. Norton

[57] ABSTRACT

A symmetrical trough waveguide isolator for isolation of signals at discrete frequencies. The trough waveguide comprises two sidewalls spaced by a bottom wall and a shorter center wall or fin symmetrically disposed between the taller sidewalls and extending upward from the bottom wall. A slab of ferrite material biased by a DC magnetic field is located between one sidewall and the center fin and a matching slab of dielectric material is located between the center fin and the opposite sidewall. A conductive cover is placed at each end of the waveguide, the covers connecting the center fin to form a cavity only as to signals propagating in the odd mode. The even mode components of signals at frequencies to be isolated are converted to odd mode components by the biased ferrite.

11 Claims, 9 Drawing Figures

INVENTOR.
Cheng P. Wen
BY Robert L. Troike
ATTORNEY

PATENTED FEB 29 1972 3,646,486

INVENTOR.
Cheng P. Wen

Robert L. Troike

ATTORNEY

INVENTOR.
Cheng P. Wen
BY
Robert L. Troike
ATTORNEY

GYROMAGNETIC ISOLATOR WHEREIN EVEN MODE COMPONENTS ARE CONVERTED TO ODD MODE COMPONENTS BY BIASED FERRITE

This invention relates to electromagnetic wave transmission system and more particularly to a nonreciprocal isolator.

Symmetrical trough waveguide antennas are well known. It has been recognized that asymmetry introduced by mechanical means in a symmetrical trough waveguide will cause power conversion from a dominant symmetrical mode to a high order asymmetrical mode which will in turn radiate through the open side of the waveguide to free space. For a further description of such symmetrical trough waveguide antennas, see Rotman, U.S. Pat. No. 2,943,325.

Also, a form of trough waveguide nonreciprocal isolator is known where microwave absorption material is placed within the trough waveguide above the center ridge to absorb odd mode signals within the guide. This type is described by Weisbaum in U.S. Pat. No. 2,903,656. In attempting to build isolators of this nature however, relatively low isolation was provided over a relatively short length of trough waveguide with relatively low magnetic field bias. Trough waveguide isolators containing ferrite slabs in the troughs and where the DC magnetic field applied to the slabs is sufficient to provide ferromagnetic resonance isolation are known. However, when it is attempted to use such a resonant symmetrical trough waveguide isolator in the millimeter wave frequency region, the biasing DC magnetic field required is very high and the associated equipment is both large and costly.

It is an object of this invention to provide an improved ferrite isolator requiring a relatively small magnetic field bias and which can, over a relatively short length, provide high isolation at selected frequencies.

Briefly, this and other objects of the present invention are realized by a transmission line for propagating electromagnetic signal waves over a given range of frequencies in an even mode. A nonreciprocal mode converter is provide for converting signal waves at selected frequencies traveling in a given direction from an even to an odd mode. A cavity is provided that is coupled only to signals in the odd mode for providing optimum power transfer of signals in the mode from the waveguide at the selected frequencies.

Figures 1, 2, 3, 5:
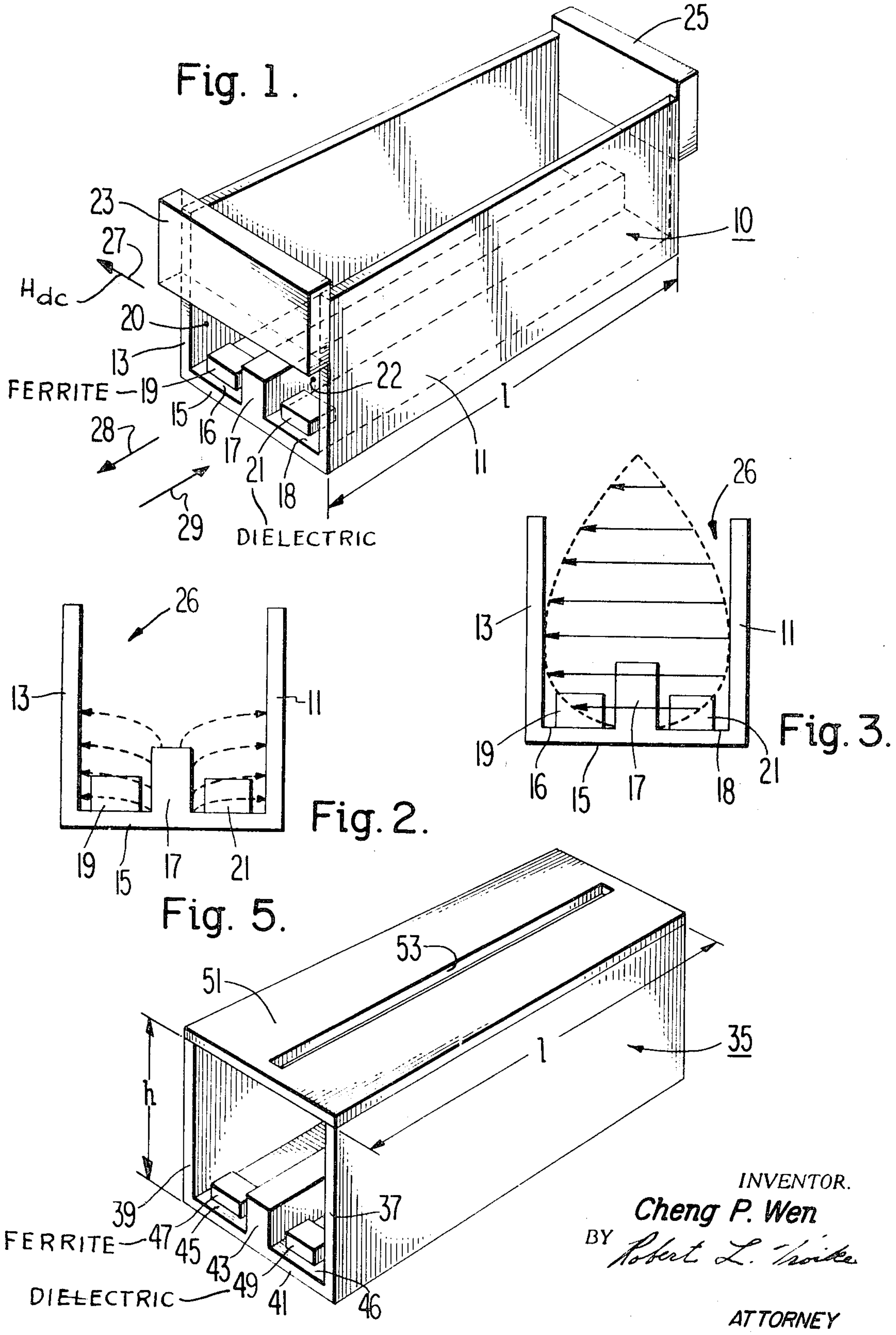
Figure 4:
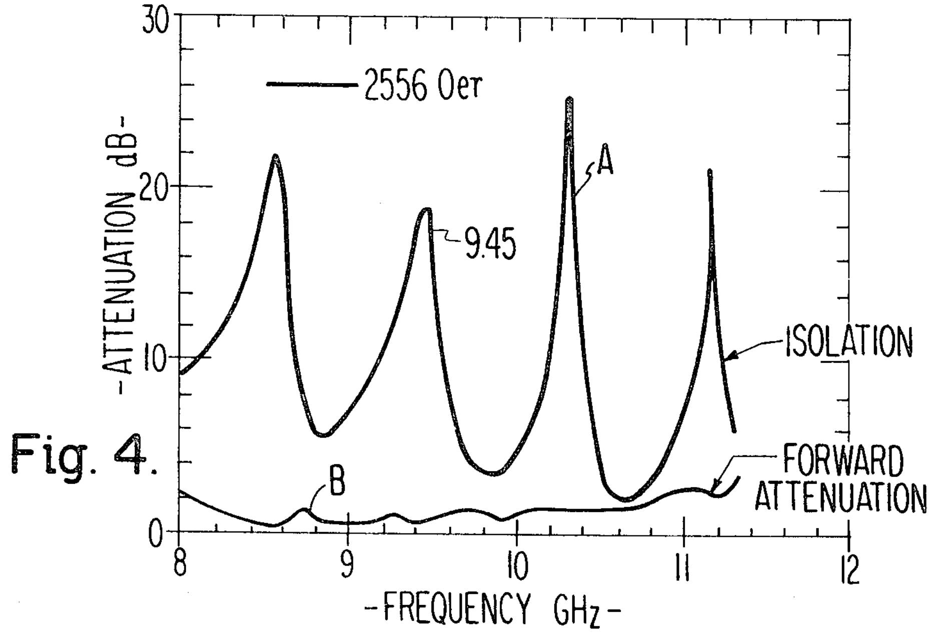

This invention will be further described in conjunction with the accompanying drawings wherein:

FIG. 1 is a perspective view of a symmetrical trough waveguide isolator in accordance with a first embodiment of the present invention, FIG. 2 illustrates the electric field of signals in the even mode in the dielectrically loaded trough waveguide of FIG. 1, FIG. 3 illustrates the electric field of signals in the odd mode in the dielectrically loaded trough waveguide of FIG. 1, FIG. 4 is a plot of attenuation in decibels (db.) vs. frequency for the symmetrical trough waveguide isolator of FIG. 1.

Figures 6, 7:
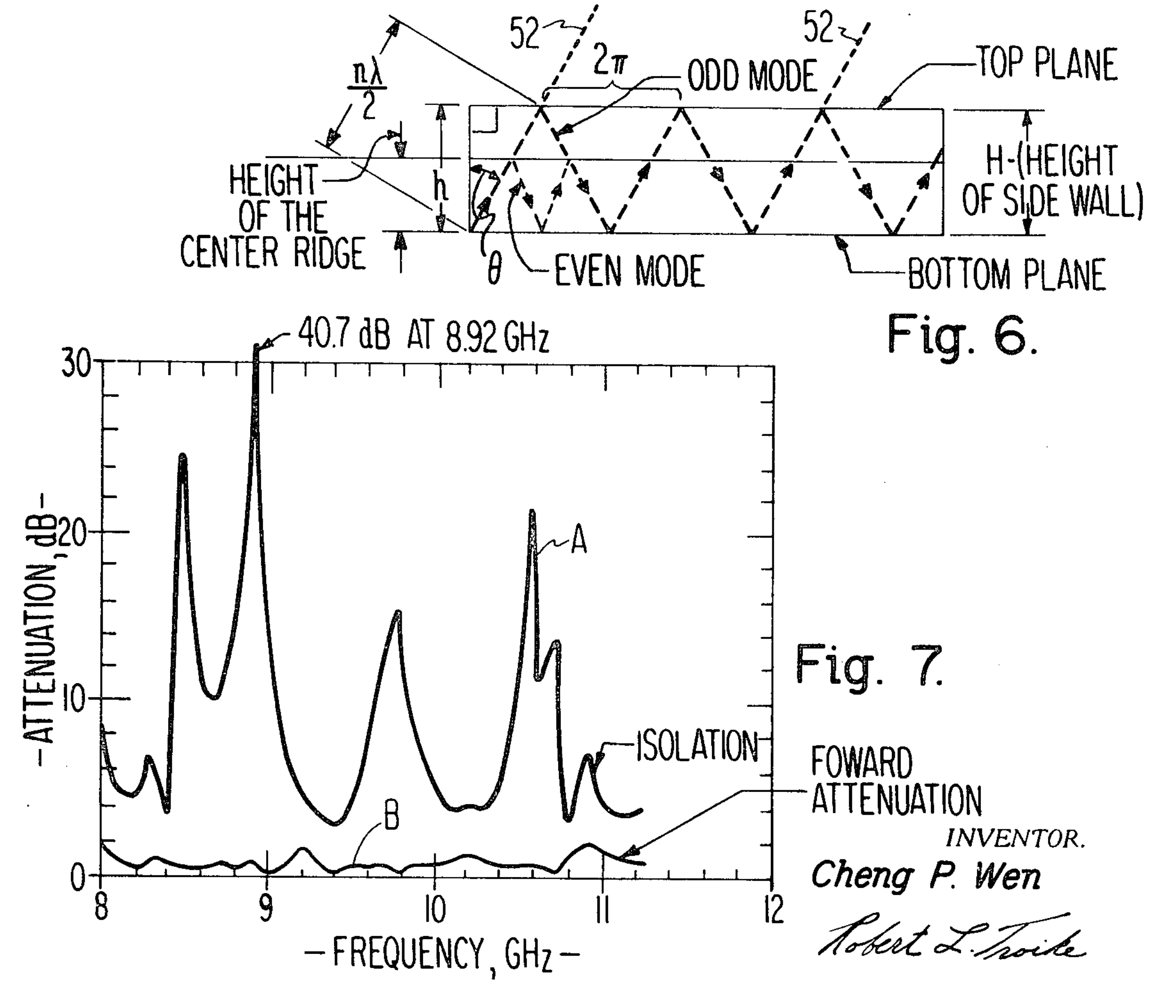
Figure 8:
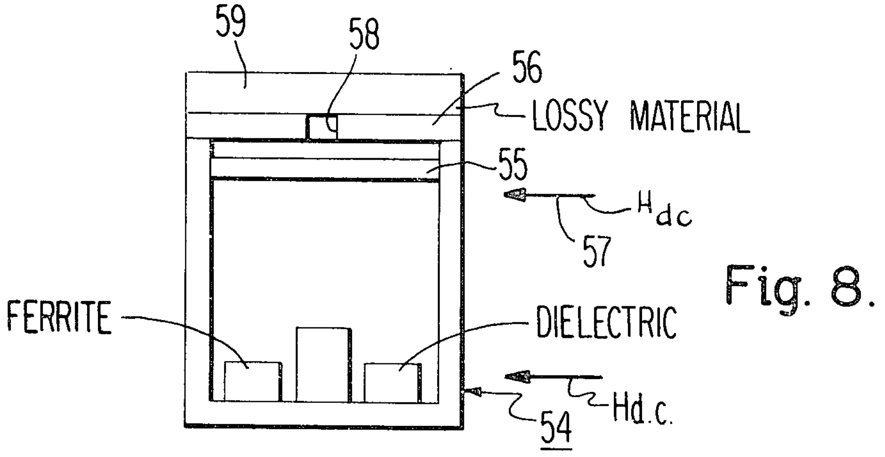
Figure 9:
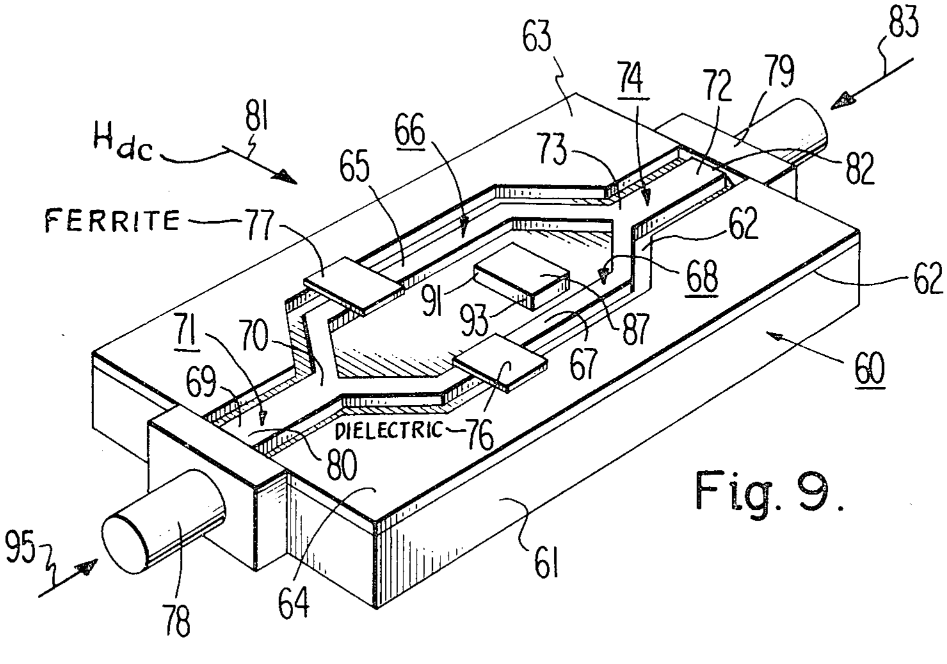

FIG. 5 is a perspective view of a symmetrical trough waveguide isolator in accordance with another embodiment of the present invention, FIG. 6 is a schematic sketch of the side view of a symmetrical trough waveguide illustrating the propatation of the even and odd modes, FIG. 7 is a plot of attenuation (db.) vs. frequency for a symmetrical trough waveguide isolator of the type illustrated in FIG. 5 with conductive end plates, FIG. 8 is a cross section of an isolator in accordance with a further embodiment of the present invention, and FIG. 9 is an isolator in accordance with a still further embodiment of the present invention.

Referring to FIG. 1, there is illustrated a symmetrical trough waveguide isolator 10. The waveguide 10 is made up of sidewalls 11 and 13 spaced from each other by bottom wall 15. A center ridge or fin 17 is spaced equidistant from and between the sidewalls 11 and 13. The fin 17 extends from and is perpendicular to the bottom wall 15 and parallel to sidewalls 11 and 13, thus forming troughs 16 and 18. A slab 19 of "-gyromagnetic" material is placed in a first trough 16 between the center fin 17 and sidewall 13.

The term "gyromagnetic" material refers to ferrimagnetic, ferromagnetic and antiferromagnetic material, which materials exhibit a phenomenon associated with the motion of dipoles in these materials, which in the presence of a DC magnetic field is similar in many respects to the classical gyroscope. These materials and their properties are discussed by Lax and Button in chapters 1 through 6 of their book entitled "Microwave Ferrites and Ferrimagnetics," published 1962 by McGraw-Hill New York, U.S.A.

A matching slab 21 of low loss dielectric material of the same dimension is placed at the opposite trough 18 of the symmetrical trough waveguide between center ridge 17 and sidewall 11. The upper portions of the sidewalls 11 and 13 are shorted by means of a conductive plate 23 at one end of the trough waveguide and by means of a second conductive plate 25 at the longitudinally opposite end of the trough waveguide 10.

Since the plates 23 and 25 are only coupled to the upper portions of the sidewalls and are not coupled to the fin 17, these plates only provide shunting of the signals in the odd or asymmetrical mode. The length L of the cavity formed by the shorting plates 23 and 25 is made equal to $n\lambda/2$, where $\lambda$ is the odd mode isolation frequency wavelength and $n$ is an integer. Coupling into and out of the trough waveguide 10 may be provided by a pair of coaxial couplers, not shown, where the center conductor of each coupler is connected to the center ridge 17 and the outer conductor of each coupler is connected to the sidewalls 11 and 13 and the bottom wall 15.

Associated with electromagnetic waves propagating in the direction of arrow 29 along the trough waveguide is a clockwise rotating component of the magnetic field presented at points 20 and 22 when viewing these points in the direction of arrow 27. That is, as the electromagnetic wave propagates in the direction of arrow 29, a magnetic field vector associated with electromagnetic waves appears to rotate in space in a clockwise direction when viewing the pints 20 and 22 along the direction of arrow 27. For signal waves propagating in the opposite direction, or the direction of arrow 28, the magnetic field component at points 20 and 22 appears to rotate in space in a counterclockwise direction.

In accordance with an accepted explanation of the theory of gyromagnetic materials, unpaired electron spins in the material tend to align their axes of spin to the externally applied magnetic field, and thus precess about the lines of the externally applied magnetic field. If this precession of the magnetic moment of the electron spin is in the same direction as the rotating magnetic field, as in the case of signals propagating in the direction of arrow 29, the wave will encounter an effective permeability of less than unity, i.e., negative permeability. If this precession of the magnetic moment of the electron spin is in the opposite direction of the rotating magnetic field, as in the case of waves propagating in the direction of arrow 28, the effective permeability encountered by the wave is greater than unity, i.e., positive permeability. While changes in the applied DC magnetic field across a gyromagnetic slab cause only a minimal amount of positive permeability change, large changes occur in the negative permeability. This difference in permeability change provides a nonreciprocal device. If, as in the case of the embodiment of FIG. 1, the DC magnetic bias field and the material of the slab 19 are chosen so that the product of permeability and dielectric constant of slab 19 for signals propagating in the direction of arrow 28 is made equal to the product of permeability and dielectric constant of the slab 21, a balanced condition exists for signals propagating in the direction of arrow 28 and an unbalanced condition exists in the direction of arrow 29. The unbalanced condition exists for signals propagating in the direction of arrow 29 due to the negative permeability associated with signals traveling in that direction, which causes a difference in the phase retardation for that portion of the signal propagating along trough 16 relative to that propagating along trough 18.

Signals normally propagate along the trough waveguide 10 in the even mode. Referring to FIG. 2, there is illustrated the electric field associated with the even mode. The electric field, as indicated by dashed arrows, is predominantly between the center fin 17 and the side walls 11 and 13 with the electric field lines extending in opposite directions from fin 17 to sidewalls 11 and 13. The intensity of the electric field of the even mode increases from the bottom wall 15, is maximum in the region of the slabs 19 and 21 and at the top of the center fin, and then decays rapidly to be essentially zero along the upper portion 26 of the waveguide 10.

Under a certain condition where there is a difference in the phase velocity of the signal propagating in the two troughs, radiating odd mode signals can be excited along the waveguide. Referring to FIG. 3, there is illustrated the electric field associated with the odd mode. The electric field of the odd mode, as indicated by arrows in FIG. 3, is in the same direction in both troughs 16 and 18 and extends above the center fin and above the open side of the waveguide 10. The intensity of the electric field increases from the bottom wall 15, is maximum near the top of the center fin and then decays toward the open side. For a substantial unbalance, a substantially large electric field intensity is in the upper portion 26 of the waveguide section 10 and signal radiation or leakage occurs along the length of the open side of the trough waveguide 10. As can be seen referring to FIGS. 2 and 3, more of the electromagnetic field energy in the odd mode is outside of the dielectrically loaded region of slabs 19 and 21 than the even mode, and consequently the wavelength at a given frequency in the odd mode is slightly longer than even mode at the same given frequency.

Upon the application of a sufficient DC magnetic field bias in the direction of arrow 27 and the application of electromagnetic signals to the waveguide in the direction of arrow 29, a differential phase retardation of the portion of the signal propagating in the gyromagnetically loaded trough 16 relative to the portion of the signal along the dielectrically loaded trough 18 occurs, causing excitation of the applied signals in the odd or asymmetrical mode. The signals traveling in the opposite direction or direction 28 do not experience a differential phase retardation because of the previously described balanced condition of the gyromagnetic slab 19 and the dielectric slab 21. This unidirectionality of mode conversion makes this device nonreciprocal.

Although as described above, by causing the phase velocity of the signal in the two troughs to differ, the radiating odd mode is excited and the amount of radiation or conversion along the waveguide would be minimized by destructive interference between the radiating signals. A maximum transfer of power from the even mode to the radiating odd mode and from the radiating odd mode into free space above can be obtained by constructive interference between the radiating signals along the waveguide. Constructive interference at the desired frequencies is provided in the above embodiment by arranging the length between the short-circuited ends provided by conductive plates 23 and 25 to be equal to $n\lambda/2$ where $\lambda$ is an odd mode wavelengths at the operating frequency of the isolator and $n$ is an integer.

In an arrangement as described, greater than 30 db. of attenuation for frequencies of about 8.48 GHz., 9.40 GHz. and 10.55 GHz. with an applied bias of 2,556 oersteds was provided. The slab 19 of gyromagnetic material was 0.191 cm. by 0.382 cm. by 10.16 cm. and the material was G–113 YIG (Yittium Iron Garnet), sold by Trans Tech of Gathersburg, Md. The matching slab 21 of dielectric material was Stycast K–15 made by Emerson and Cuming, Inc. Canton, Mass. and of the same dimension as the YIG material in the opposite trough. Both the gyromagnetic slab 19 and the dielectric slab 21 are placed 0.127 cm. from the bottom wall 15 by bonding them to the sidewalls. The center fin or ridge 17 is 1.143 cm. high and 0.127 cm. wide. Troughs 16 and 18 are 0.254 cm. wide and the side walls are 1.60 cm. high. Input into and out of the waveguide section is provided by coaxial connectors where the center conductor is coupled to the fin 17 and the outer conductor is connected to the sidewalls 11 and 13.

Referring to the plot of FIG. 4, when a magnetic field of 2,556 oersteds is applied to the arrangement described above in the direction of arrow 27, the attenuation through the waveguide section as illustrated by curve A is 20 db. or more at discrete frequencies. It has been found that the frequency intervals between the absorption peaks are observed to decrease with increasing magnetic field bias while the absorption peaks are at a maximum in the bias field of 2,556 oersteds, although the coupling between the even and odd modes is found to increase with the applied magnetic field in the direction of arrow 27.

As illustrated in curve B of FIG. 4, the forward attenuation for the arrangement described appears to be no more than 1 to 2 db.

It will be understood that the odd mode guide wavelength $\lambda$ in the arrangement in FIG. 1, may be changed by changing the height of the center fin relative to the sidewalls and therefore the length of the cavity may be changed corresponding to the guide wavelength change caused by the changing of the height of the fin relative to the sidewalls.

Referring to FIG. 5, there is illustrated a second arrangement for providing a trough waveguide gyromagnetic isolator. The isolator 35 comprises a trough waveguide having sidewalls 37 and 39, bottom wall 41 and center fin 43 located along the length of the waveguide equidistant from the walls 37 and 39 of the waveguide to form troughs 45 and 46 on the opposite sides of the center fin 43.

In the trough 45, there is located a slab 47 of gyromagnetic material having a given dielectric constant and in the trough 46 is located a slab 49 of dielectric material having a dielectric constant substantially the same as that of the gyromagnetic slab 47. A cover plate 51 is placed on top of the symmetrical trough waveguide 35 which is illustrated in FIG. 5. A narrow slit or aperture 53 less than a third of the width of the spacing between sidewalls 37 and 39 is centered between the sidewalls and above the center fin 43 and extends almost the entire length of the waveguide 35.

The effective height "$h$" of waveguide 35 is made equal to one-half the wavelength of the odd mode cutoff frequency of the isolator. The plate 51, spaced the distance "$h$" from the bottom wall 41, provides a transverse cavity as to the odd mode. Whenever the signal from the odd mode undergoes a multiple of $2\pi$ radians phase shift as it impinges on the top plate 51, as shown in FIG. 6, constructive interference results and there will be a maximum transfer of power from the dominating even mode through the radiating odd mode into free space through aperture 53.

Nearly complete power transfer is possible if the coupling between the even mode and odd mode is identical to the coupling between the odd mode and free space. This type of constructive interference effect occurs when the effective height $h$ of waveguide 35 is equal to $n\lambda/2 \cos \theta$, where $\theta$ is the angle between the normal of the trough waveguide, as illustrated by FIG. 6, and the radiating direction of the odd mode (dashed line 52), $n$ is an integer $\lambda$ is an odd mode wavelength at the operating frequency of the isolator.

The cosine of the angle $\theta$ is equal to $f_c/f$, where $f_c$ is the cutoff frequency of the cavity and $f$ is the operating frequency of the isolator. Once the cutoff frequency is determined, the corresponding peak absorption frequencies are equal to $nf_c^2$ where $n$ is the integer. The value of $f_c$, the cutoff frequency, may be determined by radiation pattern measurements. If, for example, $f_c$ is measured to be 6.06 GHz., then maximum absorption is predicted to take place in accordance with this arrangement at 6.06 GHz., 8.56 GHz. and 10.52 GHz., corresponding to integers $n$ equal to 1, 2 and 3 respectively.

A device like that illustrated in FIG. 1, including the end plates like that of plates 23 and 25 and with the addition of the top plate as illustrated in FIG. 5 was tested. The predictions above fit the absorption peaks observed for a device similar in construction where $f_c$ was measured to be 6.06 GHz. As seen in FIG. 7, the absorption peaks as indicated by curve A for this arrangement occurred at 8.48 GHz. and 10.55 GHz. Also there was a large absorption peak at 8.92 GHz. In this arrangement, the dimensions of the waveguide were the same as that of FIG. 1 with $h$ being equal to 1.6 cm., the width of aperture 53 was 50 mils wide and the DC magnetic biasing field was again 2,556 oersteds. The forward attenuation as indicated by curve B was at most 2 db.

As mentioned previously in connection with the embodiment of FIG. 1, the height $h$ of the fin relative to the sidewalls determines the guide wavelength. Therefore, the spacing between the peaks that impinge on the top plate changes depending on the height of the center ridge relative to the sidewalls. Also, the length L of the cavity should be at least about 5 wavelengths at the operating frequency to minimize the destructive interference effects and provide optimum coupling of signals from the even to odd mode.

Also, the center frequency of operation may be altered by varying the distance between the cover plate and the bottom of the troughs. An effective change in this distance may be achieved, as illustrated in FIG. 8, by the placement of a slab 55 of gyromagnetic material under the cover plate 56 of trough waveguide 54 and by the application of a DC magnetic field in the direction of arrow 57, for example, to the slab 55. Also, if it is desired, a body 59 of microwave absorption material may be placed on the opposite side of the cover plate 56 or outside the trough waveguide 54 to absorb the power coupled from the trough waveguide through the aperture 58.

Referring to FIG. 9, there is illustrated another embodiment of the present invention using coplanar strip transmission lines of the type described in U.S. Pat. application, Ser. No. 787,349 filed Dec. 27, 1968, by applicant, now U.S. Pat. No. 3,560,893. In accordance with with this form of transmission line, described in the above-cited application, the narrow striplike conductors are spaced in coplanar relationship from a relatively wide ground planar conductor on a dielectric substrate. As mentioned in connection with FIG. 1 of the above-cited application, the RF magnetic field vectors at the dielectric-air interface between the narrow conductor and the wider ground conductor appear nearly circularly polarized in the same sense on the opposite sides of the narrow conductor.

In accordance with the principles described above, when a body of gyromagnetic material is placed in the region of the circularly polarized magnetic field vectors and this material is properly biased by a DC magnetic field, RF electromagnetic signals propagating in one direction "see" a different permeability than signals propagating in the opposite direction along the transmission line.

Referring to FIG. 9, there is illustrated a coplanar transmission line isolator 60. The isolator 60 includes a pair of wider ground planar conductors 63 and 64 on the surface 62 of dielectric substrate 61. A first elongated section 65 of narrow striplike conductive material is closely spaced to wider conductor 63 on surface 62 to form a first section 66 of coplanar strip transmission line. A second elongated section 67 of narrow striplike conductive material is closely spaced to wider ground conductive material is closely spaced to wider ground conductor 64 on surface 62 to form a second section 68 of coplanar strip transmission line. A third elongates section 69 of narrow striplike conductive material is joined at one end 70 to one end of sections 65 and 67 of narrow striplike conductive material.

The third section 69 of narrow striplike conductive material is closely spaced to wider conductors 63 and 64 to form a third section 71 of coplanar transmission line. A fourth elongated section 72 of narrow striplike conductive material is joined at one end 73 to the opposite free ends of first and second sections 65 and 67 of narrow striplike conductive material and is closely spaced to wider conductors 63 and 64 to form a fourth section 74 of coplanar transmission line.

Except for that portion where the first section 65 and the second section 67 are coupled to the third section 69 and fourth section 72, these narrow conductor sections 65 and 67 are spaced from each other so as to be out of the close coupling region but are sufficiently close to each other so as to permit odd and even mode propagation therealong. Also, for impedance matching, the first section 65 and the second section 67 each have a width approximately equal to one-half the width of the third section 69 and the fourth section 72. The substrate 61 is made of sufficiently high dielectric constant material having a dielectric constant of 5 or more to confine the electromagnetic field energy between the narrow conductors and the ground planar conductors.

Coupling into and out of the isolator 60 of FIG. 9 may be provided by coaxial connectors 78 and 79. The inner conductor of the connector 78 is connected to the free end 80 of narrow conductor section 69 and the outer conductor of the coaxial connector 78 is connected to the wider ground planar conductors 63 and 64. The inner conductor of the connector 79 is connected to the free end 82 of narrow conductor section 72 and the outer conductor of the connector 79 is connected to the wider ground planar conductors 63 and 64.

In the region of first transmission line section 66 between the narrow striplike conductor section 65 and the wider planar conductor 63 is placed a slab 77 of gyromagnetic material. The slab 77 should have a dielectric constant of at least eight greater than the substrate. In the region of the second transmission line section 68, a slab 76 of dielectric material is placed in the region between the narrow striplike conductor section 67 and the wider ground planar conductor 64.

The dielectric constant of the slab 76 is such that the product of the permeability times the dielectric constant is equal to the product of permeability and dielectric constant for the DC magnetic field biased gyromagnetic slab 77 for electromagnetic signals propagating in the direction of arrow 83 along the transmission line sections 66 and 68.

A narrow striplike conductor 87 is spaced between the narrow striplike conductors 65 and 67 with the end point 91 closely spaced to the narrow striplike conductor section 65 so as to be in the close electromagnetic coupling region thereof and the end 93 is likewise closely spaced to the narrow striplike conductor section 67. The narrow striplike conductor 87 has a length L between the end points 91 and 93 equal to a half-wave length long or odd multiple thereof at the operating frequency of the isolator 60.

Signals applied to coaxial connector 79 in the direction of arrow 83 are coupled to transmission line section 74 and are propagated along the transmission line 74 to the transmission line sections 66 and 68 where these signals are equally power divided. The power divided signals propagate in the same direction along the transmission line sections 66 and 68 and are combined at the end 70 of the transmission line section 71. Since the product of permeability and dielectric constant for slabs 76 and 77 are equal for signals propagating in this direction, the signals arrive at end 70 of conductor section 69 in phase. Also, since these signals are in phase at the points along transmission lines 66 and 68 where the conductor 87 is closely spaced, no appreciable coupling to this conductive cavity occurs. The electromagnetic signals are combined in phase and coupled along transmission line 71 to coupler 78 and out of the isolator 60.

Electromagnetic signal applied in the direction of arrow 95 are coupled to connector 78. These signals are coupled to end 80 of narrow striplike conductor section 69 and propagate along the transmission line section 71 whereupon reaching end 70, these signals are power divided between the transmission line sections 66 and 68.

Due to the difference of permeability for the two directions of signal propagation exhibited along transmission line 66, when the DC magnetic field is biased in the direction of arrow 81 to slab 77, the product of the dielectric constant times the permeability along transmission line section 66 is different from that along the transmission line section 68. This phase difference produces in effect, upon the application of signals to coupler 78, a positive potential at one end 91 of narrow striplike conductor 87 when at the opposite end 93 there is a relative negative potential a half-wavelength away at the operating frequency of the isolator. This narrow conductor 87 therefore acts as a coupled resonant cavity to selected insulation frequencies and signals at the frequency wherein the conductor is resonant are coupled from the transmission line sections 66 and 68 to the conductor 87 and from the conductor these signals are radiated into free space.

What is claimed is:

1. A nonreciprocal isolator for isolation of signals at a predetermined frequency comprising, in combination:

a transmission line for propagating electromagnetic signal waves along a given path over a given range of frequencies in an even mode, means for converting those of said signal waves which propagate only in a given direction along said transmission line from said even mode to an odd mode, and a resonant cavity coupled to said transmission line, said cavity being resonant at a frequency corresponding to a multiple of one-half wavelength at said predetermined frequency, said cavity being arranged to interact only with those of said signal waves being propagated in said odd mode, said cavity further being arranged to provide optimum power transfer of signals propagating in said given direction at said predetermined frequency (i) from said even mode to said odd mode, and (ii) away from the propagation path of said transmission line.

2. The isolator claimed in claim 1 wherein the means for exciting said odd mode includes a member of gyromagnetic material.

3. A symmetrical trough waveguide isolator for isolation of signals at predetermined frequencies propagating therealong comprising:

a trough waveguide having conductive longitudinally extending sidewalls spaced by a longitudinally extending conductive bottom wall and a shorter conductive center fin symmetrically disposed between said sidewalls and extending from said bottom wall to form a first trough between the center fin and a sidewall and a second trough between the center fin and the opposite sidewall, said dimensions and spacings of said sidewalls being arranged to allow propagation of said signals along a given path in the even and odd modes, a member of gyromagnetic material in said first trough and a member of dielectric material in said second trough, said member of dielectric material having a dielectric constant compared to that of the member of gyromagnetic material when biased at a first value of DC magnetic field so that said signals propagate along the waveguide in the even mode, means for providing a second value of DC magnetic field bias to said member of gyromagnetic material to cause upon the application of electromagnetic signals in a given direction at said predetermined frequency to said waveguide excitation of said signals from said even mode to said odd mode, means for forming a cavity to interact only with those of said signals in the odd mode, said cavity being dimensioned relative to said predetermined frequency of said applied signals to provide power transfer of signals propagating in said given direction at said predetermined frequencies applied thereto away from the propagation path of said trough waveguide.

4. The combination claimed in claim 3 wherein said cavity forming means includes a conductive plate on opposite longitudinal ends of said trough waveguide and wherein the electrical length of said trough waveguide between said conductive plates is equal to $n\lambda/2$ where n is an integer and $\lambda$ is an odd mode operating wavelength at said predetermined frequencies.

5. The combination claimed in claim 3 wherein the strength of said DC magnetic field bias is below that required for gyromagnetic resonance.

6. The combination claimed in claim 3 wherein a conductive plate is placed across the sidewalls above the center ridge and extends along the longitudinal length of the trough waveguide and said conductive plate has a relatively thin aperture extending along the length of said waveguide.

7. The combination claimed in claim 6 wherein the width of the aperture is relatively thin compared to the width of the plate.

8. The combination claimed in claim 7 wherein the width of the aperture is less than one-third the spacing between said sidewalls.

9. The combination as claimed in claim 8 above wherein the effective height of the trough is equal to $n\lambda/2 \cos \theta$, where $\lambda$ is equal to an odd mode wavelength at said predetermined frequency, n is an integer and $\theta$ is equal to the angle between the midpoint of the trough waveguide section and a line passing through the centroid of the lobe of the radiated wave.

10. An isolator including a transmission line for isolation of signals at predetermined frequencies propagating along said transmission line comprising:

a dielectric substrate, a first section of narrow elongated striplike conductive material positioned on said substrate, a second section of narrow elongated striplike conductive material positioned on said dielectric substrate spaced from said first section, a third section of narrow striplike conductive material positioned on said substrate and joined at one end to one end of said first section and said second section, a fourth section of narrow striplike conductive material positioned on said substrate and joined at one end to the free ends of both said first section and said second section, wide striplike conductor means including at least one ground planar conductor located on said substrate and spaced from said first, second, third and fourth sections to form respectively a first, second, third and fourth transmission line sections of said transmission line, means for coupling said signals into and out of said third and fourth transmission line sections, a member of gyromagnetic material associated with said first section and a member of dielectric material associated with said second section, said member of dielectric material having a dielectric constant and the spacing between the first and second section being arranged so that said signals propagate in a given path along said first and second sections in the even mode, means for providing sufficient DC magnetic bias to said member of gyromagnetic material to cause upon the application of said signal in a given direction conversion of said signals from said even mode to odd mode, a narrow strip of conductive material having a length equal to an odd multiple of half wavelengths at said predetermined frequencies coupled between said first and second sections in a manner to provide optimum power transfer of signals at said predetermined frequencies in said odd mode away from the propagation path of said transmission line.

11. The combination as claimed in claim 10 wherein said wider conductor means comprises two wide ground planar conductors on the same surface of said substrate as said first, second, third and fourth sections of narrow striplike conductive material with one of the wide ground planar conductors closely spaced to said first, third and fourth narrow striplike conductor sections and the second of the wide ground planar conductors closely spaced to said second, third and fourth striplike conductor sections.

* * * * *

UNITED STATES PATENT OFFICE
CERTIFICATE OF CORRECTION

Patent No. 3,646,486 Dated February 29, 1972

Inventor(s) Cheng Paul Wen

It is certified that error appears in the above-identified patent and that said Letters Patent are hereby corrected as shown below:

Abstract, line 10, after "connecting" insert --the upper portions of the side walls without contacting--.

Column 1, line 37, correct "provide" to read --provided--.

Column 1, line 41, before "mode" insert --odd--.

Column 2, line 37, correct "pints" to read --points--.

Column 5, line 31, cancel "with" second occurrence.

Column 5, line 55, before "ground" second occurrence cancel --ground conductive material is closely spaced to wider--.

Column 5, line 57, correct "elongates" to read --elongated--

Column 7, line 3, before "is" insert --87--.

Signed and sealed this 25th day of July 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334